United States Patent
Brewington et al.

(10) Patent No.: US 6,527,294 B1
(45) Date of Patent: Mar. 4, 2003

(54) CONVERTIBLE TANDEM STROLLER

(76) Inventors: Mark Everett Brewington, 1425 Pineridge Dr., Greenville, NC (US) 27834; Kim L. M. Brewington, 1425 Pineridge Dr., Greenville, NC (US) 27834

(*) Notice: Subject to any disclaimer, the term of this patent is extended or adjusted under 35 U.S.C. 154(b) by 0 days.

(21) Appl. No.: 09/861,484

(22) Filed: May 21, 2001

Related U.S. Application Data

(60) Provisional application No. 60/206,272, filed on May 23, 2000.

(51) Int. Cl.[7] .............. B62B 9/00; B62B 33/06
(52) U.S. Cl. .............. 280/647; 280/47.38; 280/43; 16/30
(58) Field of Search .............. 280/647, 642, 280/643, 646, 648, 649, 650, 43, 38, 47.38; 16/30

(56) References Cited

U.S. PATENT DOCUMENTS

| | | | | |
|---|---|---|---|---|
| 4,362,307 A | * | 12/1982 | Nakatani | 280/30 |
| 4,632,409 A | * | 12/1986 | Hall et al. | 280/30 |
| 4,805,938 A | * | 2/1989 | Redmond et al. | 280/47.35 |
| 4,845,804 A | * | 7/1989 | Garrett | 16/19 |
| 5,221,106 A | * | 6/1993 | Shamie | 280/644 |
| 5,253,389 A | * | 10/1993 | Colin | 16/30 |
| 5,312,006 A | * | 5/1994 | Lag | 211/195 |
| 5,522,121 A | * | 6/1996 | Fraynd et al. | 24/335 |
| 5,918,892 A | * | 7/1999 | Aaron et al. | 280/47.38 |
| 6,402,186 B1 | * | 6/2002 | Garland | 280/347 |

* cited by examiner

Primary Examiner—Brian L. Johnson
Assistant Examiner—Jeffrey Restifo
(74) Attorney, Agent, or Firm—Mills Law Firm PLLC

(57) ABSTRACT

A convertible tandem stroller includes a releasable lateral and longitudinal coupling system for permitting cojoint and independent movement of a pair of strollers. The coupling system does not have to be removed and stowed for independent operation. To permit compact lateral coupling of the strollers one of the front wheels may be raised during tandem operation by a hinge assembly and tethering connector.

8 Claims, 4 Drawing Sheets

CONVERTIBLE TANDEM STROLLER

RELATED APPLICATION

This application claims the benefit under 35 USC 121 of U.S. Provisional Application No. 60/206,272 filed on May 23, 2000 in the name of Mark E. Brewington and Kim L. M. Brewington and entitled "Convertible Tandem Stroller.

FIELD OF THE INVENTION

The present invention relates to infant strollers that can be coupled in tandem relationship for cojoint movement and decoupled for independent movement.

BACKGROUND OF THE INVENTION

Strollers for transporting two infants at a time are generally available in two categories. First, a dedicated fixed stroller structure wherein two seat areas are in permanent side-by-side relation as disclosed in U.S. Pat. No. 5,221,106 to Shamie. Such structures do not permit the infants to move in separate paths and cannot be separated if only a single infant is being transported. Second, separable individual strollers that are coupled together to form a tandem unit and may be decoupled when only single infant transport is desired. Examples of such tandem coupling approaches are disclosed in U.S. Pat. No. 4,805,938 to Redmond et al. and U.S. Pat. No. 5,522,121 to Fraynd et al. These coupling systems for joining two strollers have used elongated releasable clamps to couple the strollers. The resulting width of such designs generally is greater than standard door widths limiting the utility thereof. Moreover, the clamping devices are bulky and not conveniently stored during separate operation of the strollers. Further, when the strollers are closely coupled, the inner pivoting adjacent front wheels can interfere with each other during steering movement resulting in impaired maneuverability.

BRIEF SUMMARY OF THE INVENTION

The present invention provides a releasable coupling system for umbrella type strollers wherein separate strollers may be readily connected for tandem operation, and quickly separated for independent operation. Therein, a coupling system is provided wherein one wheel assembly of the strollers is provided with a hinged wheel assembly movable from a locked normal ground engaging position for independent operation to a raised tethered position wherein the stroller can be placed in close juxtaposition with other stroller and coupled thereto thereby allowing closer positioning of the strollers and avoiding steering interference between otherwise adjacent wheels. The strollers are provided with an interengaging support pin that provides longitudinal coupling between the frames and vertically supports the stroller with the raised wheel. A pair of releasable snap-on coupling clips pivotally connected with one of the frames is engaged with the other of the frames for providing lateral coupling during tandem operation. The resulting assembly is laterally compact permitting tandem travel through convention doorways. The strollers may be separated, without tools or removal and stowing of parts, wherever separate travel of the strollers is desired.

Accordingly, it is an object of the present invention to provide a simplified system for coupling separate infant strollers for tandem movement.

Another object of the invention is to provide a tandem stroller that can be separated into individual units for independent movement quickly and without specialized tools.

A further object of the invention is to provide a stroller assembly wherein two strollers can be longitudinally and laterally coupled in compact lateral relation for tandem movement and quickly decoupled for independent movement.

DESCRIPTION OF THE DRAWINGS

The above and other objects and advantages of the present invention will become apparent upon reading the following detailed description taken in conjunction with the accompanying drawings in which.

DETAILED DESCRIPTION OF THE PREFERRED EMBODIMENT

Figure 1:
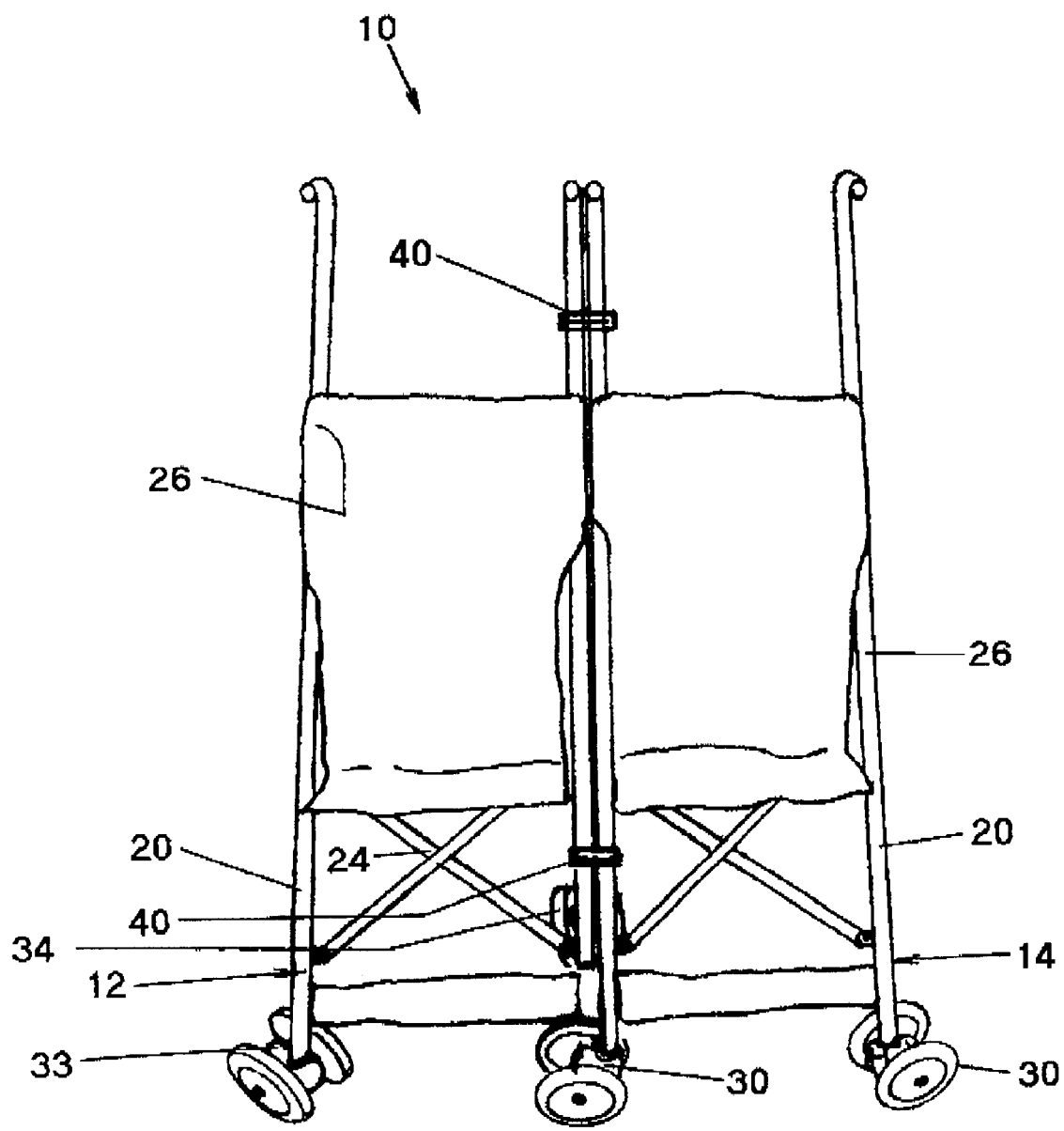
FIG. 1 is a front perspective view of a convertible tandem strolled in accordance with a preferred embodiment of the invention.
Figure 2:
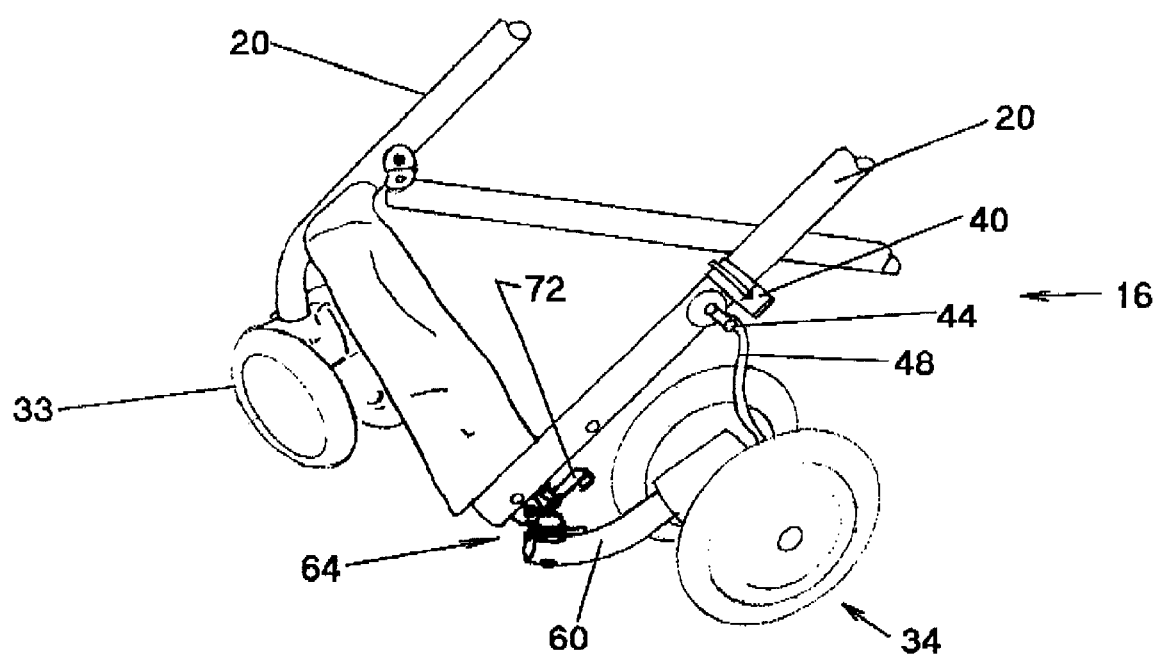
FIG. 2 is a perspective view of the tandem stroller showing the retractable front wheel in the raised position.
Figure 3:
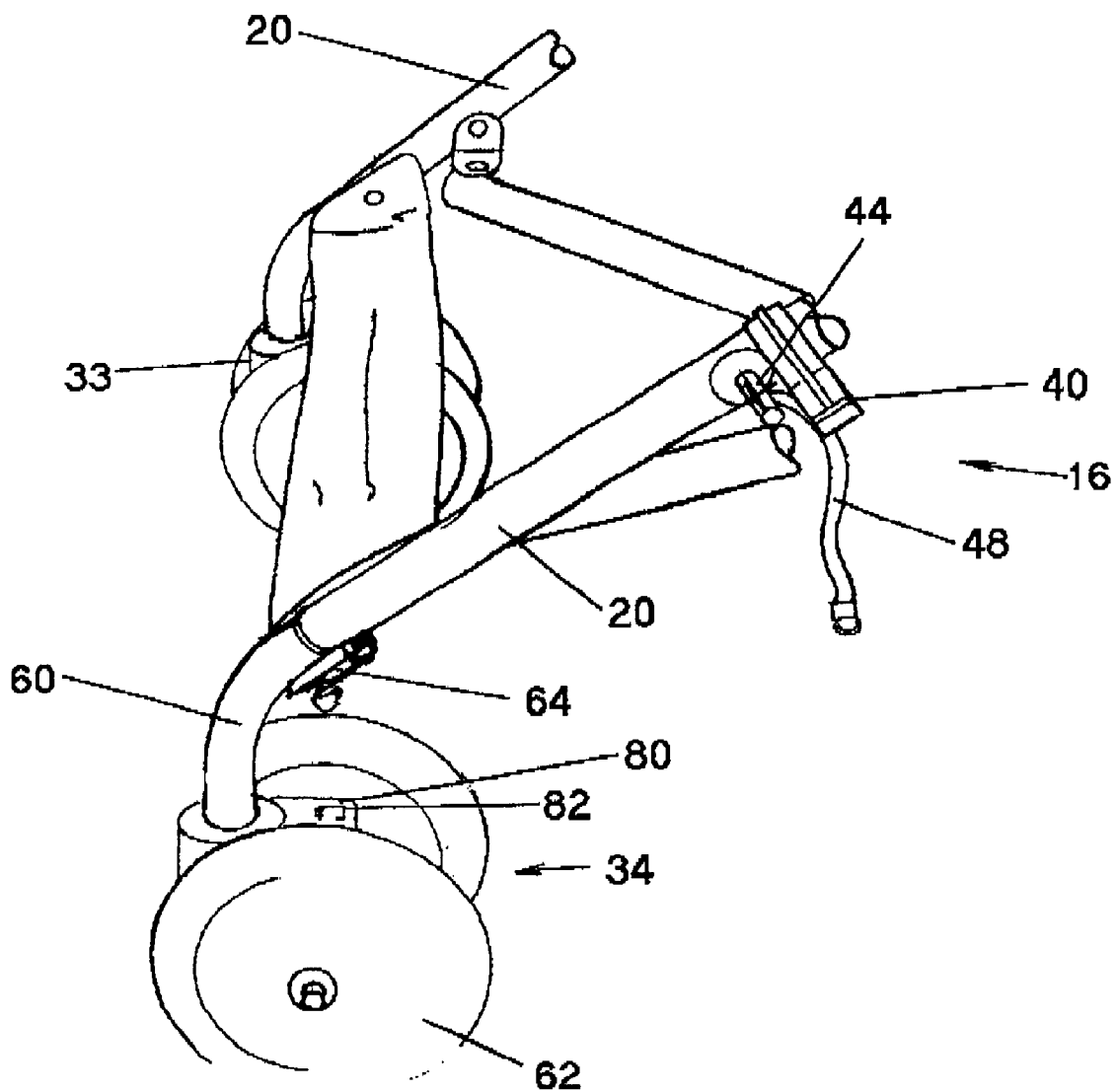
FIG. 3 is a side perspective view showing the retractable front wheel in the lowered position.

Referring to the drawings for the purpose of describing the preferred embodiment and not for limiting same, FIGS. 1 through 3 illustrate a convertible tandem stroller 10 including a first stroller 12 and a second stroller 14 interconnected for cojoint movement with a coupling system 16 whereby two infants in separate strollers may be readily connected to enable secure tandem movement of both strollers and disconnected to enable separate movement of each stroller. As illustrated, each stroller is of the conventional umbrella foldable type and will be described with reference thereto. However it will be apparent that the coupling system may be employed in conjunction with other commercially available stroller designs for providing elective tandem or individual movement.

Each stroller includes a front frame 20 and a rear frame, not shown, coupled together with a foldable locking linkage 24 for disposition between a collapsed storage position and an expanded operative position. Supported on the frames are fabric seats 26 for carrying infants in a well-known manner. Each stroller has pairs of commonly axled rear wheels, not shown, connected at the bottom of each leg of the rear frame. The right stroller 14 has a pair of commonly axled wheel assemblies 30 pivotally connected at the bottom of each leg of the front frame 20. The left stroller 12 has a fixed wheel assembly 32 and a hinged wheel assembly 34. The various wheel assemblies are pivotally for independent movement about a vertical axis for facilitating steering movement. In the separated condition, the stroller 14 may be moved in a conventional manner. Similarly, with the hinged wheel assembly 34 in the lowered position, the stroller 12 may be moved in a conventional manner. In the illustrated tandem position shown in FIG. 1, with the hinged wheel assembly 34 in the raised position, the strollers may be moved under the pivoting of the outer wheels 33, 30 and the inner wheel assembly 30 of stroller 14. In the raised position, it will be appreciated that the hinged wheel assembly 34 does not interfere with steering of the tandem stroller 10.

Referring to FIGS. 2 and 3, the coupling system 16 comprises upper and lower lateral coupling clips 40, a support pin 44, the hinged wheel assembly 34, and a tethering system 48. The clips 40 maintain the strollers 12, 14 in coupled side-by-side relation. The support pin 44 maintains longitudinal alignment and coupling, and transfers vertical loading between the strollers. The hinged wheel assembly 34 permits the releasable raising and lowering of the associated front wheels. The tethering system 48 selectively maintains the hinged wheel assembly 34 in a raised position to avoid interference with the inner wheels on the adjacent stroller.

Figure 4:
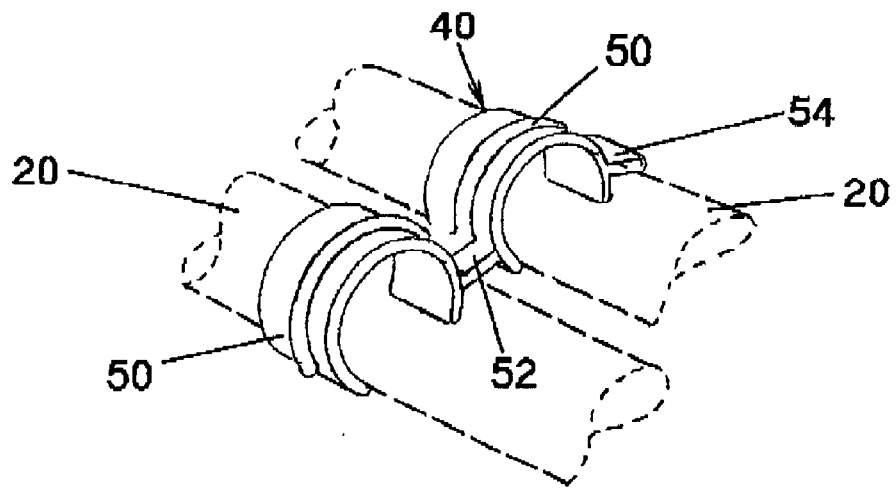
FIG. 4 is a fragmentary perspective view showing the coupler joining the side rails of the stroller in the tandem position.

Referring to FIG. 4, each clip 40 is in the form of a one-piece molding and comprises a pair of C-shaped frame clip members 50 joined by a connector section 52. Each clip member 50 comprises a cylindrical sector with an included angle of greater than 180°, preferably in the range of about 240° to 300°. In the unassembled state, the inner surface of the sector has a diameter smaller than the legs of the frame. Accordingly, when the clips 40 are resiliently snapped over the front frame leg, a positive compressive engagement is effected, with the sector resisting separation. In assembly, the clip member 50 may rotate with respect to the captured front frame leg. The other clip member 50 is provided with a radially projecting tab 54 for facilitating removal from the engaged frame leg. When disconnected, the clip will be frictionally pivotally supported at the other clip member until reconnection of the strollers is desired. Thus separate stowing of the controls clips is not required for individual stroller usage.

Figure 5:
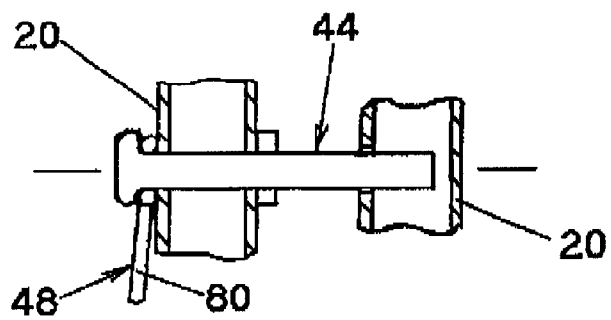
FIG. 5 is a fragmentary side cross sectional view showing the location pin in the tandem position.
Figure 6:
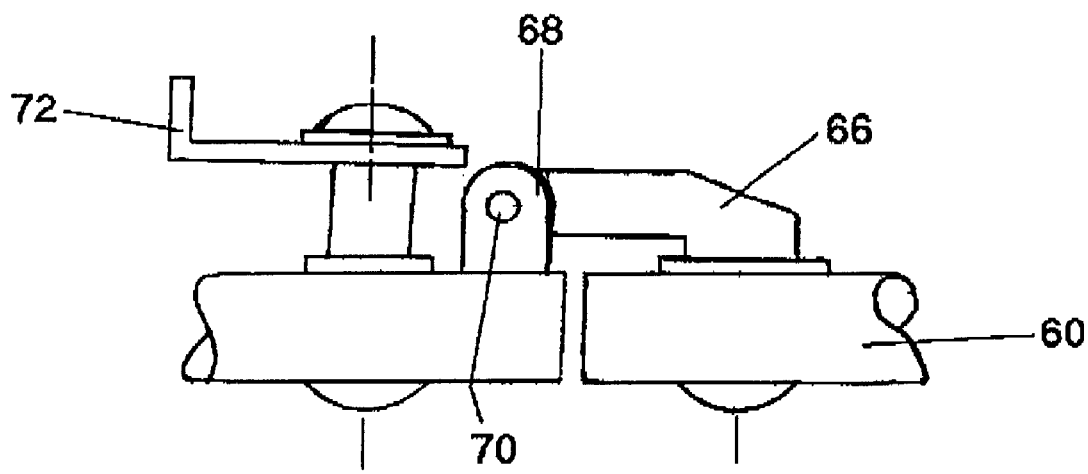
FIG. 6 is a fragmentary side elevational view showing the wheel lock assembly for the retractable wheel.

Referring to FIG. 5, the support pin 44 projects laterally outwardly from the inner leg of the left stroller 12 and is received in a correspondingly aligned clearance hole in the adjacent front leg of the right stroller 14. The support pin 44 is mechanically coupled to the associated leg by suitable fasteners. The support pin 44 has sufficient length to span the lateral distance between the adjacent legs in the tandem condition. When coupled, the support pin 44 maintains longitudinal alignment between the strollers and transfers the vertical loading between the strollers when the hinged wheel assembly 34 is in the raised position.

As shown in FIGS. 2, 3 and 7, the hinged wheel assembly 34 is provided on the inner front leg of the stroller 12, which preferably carries the support pin 44. The hinged wheel assembly 34 is provided by separating the lower portion of the front frame leg to establish a base arm 60 including the associated front wheel set 62. A hinge member 64 has a lower hinged plate 66 fastened to the rear surface of the base arm 60 and an upper hinge plate 68 fastened to the rear surface of the front support frame. The hinge plates are pivotally connected by transverse hinge pin 70 for rotation about a horizontal lateral axis between a lower position wherein the wheels engage the ground surface and the illustrated raised position thereabove. A pivotal locking bar 72 is rotatably connected to front frame and may be pivoted downwardly for engaging the lower hinge plate and locking the hinged wheel assembly 34 in the lowered position.

The tethering system 48 includes a connecting strap 80 connected at its upper end to the support pin 44 and at its lower end to a hook 82 on the front wheel hub 84 of the hinged wheel assembly 34. The connecting strap 80 has an appropriate length for maintaining the raised position of the hinged wheel assembly 34 above ground level and at a position not interfering with operation of the tandem strollers.

In use, to establish a tandem unit, the strollers 12, 14 are located in parallel side-by-side relation. The hinged wheel assembly 34 is unlocked by rotating locking bar away from the lower hinge plate whereby the base leg may be rotated upwardly about the pin 70 to the raised position. The hinged wheel assembly 34 is secured in the raised positions by connecting the terminal loop on the strap 80 to the hook 85. The front legs are shifted together until the support pin 44 is coupled with the adjacent leg. Thereafter, the control clips 40 are snapped over the front frame legs to laterally couple the stroller in unified tandem relation for cojoint movement. The raised wheel assembly does not detract from the controlled movement of the tandem unit.

When it is desired to separate the strollers for independent use the above sequence is reversed. One end of each control clip is removed from the frame and pivoted to an unobtrusive stowed position. The support pin is withdrawn, the strap 80 released and the hinged wheel assembly 34 pivoted to the lowered position and locked. Thereafter the separated strollers may be independently operated in a conventional manner.

The present invention may be directly incorporated into a set of strollers. Alternatively, the coupling system may be provided in kit form allowing convention strollers to be retrofitted for the benefits herein provided.

Having thus described a presently preferred embodiment of the present invention, it will now be appreciated that the objects of the invention have been fully achieved, and it will be understood by those skilled in the art that many changes in construction and widely differing embodiments and applications of the invention will suggest themselves without departing from the sprit and scope of the present invention. The disclosures and description herein are intended to be illustrative and are not in any sense limiting of the invention, which is defined solely in accordance with the following claims.

What is claimed:

1. A convertible tandem stroller comprising: a first stroller having first frame means carrying spaced front wheels and a second stroller having second frame means; first releasable means for coupling said first stroller to said second stroller in laterally spaced relationship; a hinge assembly pivotally connecting the front wheel of the first stroller adjacent said second stroller to said first frame means for movement between a lowered position and a raised position; tethering means connected between said front frame means for selectively maintaining said raised position; and second releasable means for longitudinally coupling and vertically supporting said first frame means with said second frame means wherein said second releasable means include a laterally projecting pin member on one of said frame means and an aligned aperture in the other of said frame means for receiving said pin member whereby said first frame means is longitudinally coupled to said second frame means and vertically supported thereat.

2. The convertible tandem stroller as recited in claim 1 including locking means cooperating with said hinge means for selectively maintaining said lowered position.

3. The convertible tandem stroller as recited in claim 1 wherein said first releasable means includes a clip member rotatably supported on one of said frame means and selectively engagable with the other of said frame means.

4. The convertible tandem stroller as recited in claim 3 wherein said clip member includes a first generally C-shaped portion engagable with said first frame means and a second generally C-shaped portion engagable with said second frame means.

5. The convertible tandem stroller as recited in claim 1 wherein said tethering means includes a strap member attached at one end to said first frame means and selectively attached at another end to said front wheel.

6. The convertible tandem stroller as recited in claim 5 wherein said tethering means is attached at said one end to said first frame means at said pin member.

7. The convertible tandem stroller as recited in claim 6 wherein said first stroller and said second stroller are umbrella type collapsible units.

8. A convertible tandem stroller comprising: a first stroller having first frame means carrying spaced front wheels and a second stroller having second frame means; first releasable means for coupling said first stroller to said second stroller in laterally aligned juxtaposed relationship; a hinge assembly pivotally connecting the front wheel of the first stroller adjacent said second stroller to said first frame means for pivotal movement about a transverse horizontal axis between a lowered position and a raised position rearwardly of the adjacent front wheel of said first stroller; tethering means connected between said front frame means for selectively maintaining said raised position; and second releasable means for longitudinally coupling and vertically supporting said first frame means with said second frame means.

\* \* \* \* \*